(12) United States Patent
Portmann

(10) Patent No.: US 9,267,662 B2
(45) Date of Patent: Feb. 23, 2016

(54) FOLDING REFLECTOR

(75) Inventor: Francois Portmann, Huningue (FR)

(73) Assignee: Bron Elektronik AG, Allschwil (CH)

( * ) Notice: Subject to any disclaimer, the term of this patent is extended or adjusted under 35 U.S.C. 154(b) by 0 days.

(21) Appl. No.: 14/112,961

(22) PCT Filed: Mar. 6, 2012

(86) PCT No.: PCT/EP2012/053780
§ 371 (c)(1),
(2), (4) Date: Nov. 18, 2013

(87) PCT Pub. No.: WO2012/146426
PCT Pub. Date: Nov. 1, 2012

(65) Prior Publication Data
US 2014/0071697 A1    Mar. 13, 2014

(30) Foreign Application Priority Data

Apr. 27, 2011 (DE) .......................... 10 2011 002 296
Aug. 3, 2011 (DE) .......................... 10 2011 052 394

(51) Int. Cl.
*G03B 15/02* (2006.01)
*F21V 7/18* (2006.01)
*G03B 15/06* (2006.01)

(52) U.S. Cl.
CPC . *F21V 7/18* (2013.01); *G03B 15/06* (2013.01); *G03B 2215/0525* (2013.01)

(58) Field of Classification Search
CPC .. F21V 7/18; G03B 15/06; G03B 2215/0525; G03B 15/02
USPC .......................................................... 362/16
See application file for complete search history.

(56) References Cited

U.S. PATENT DOCUMENTS

| 2,205,860 | A |   | 6/1940  | Olds |
|-----------|---|---|---------|------|
| 3,286,270 | A |   | 11/1966 | Kelly |
| 5,198,832 | A |   | 3/1993  | Higgins et al. |
| 5,841,146 | A | * | 11/1998 | Briese ...................... 250/493.1 |
| 6,176,598 | B1 | * | 1/2001 | Seligman et al. ............. 362/352 |
| 7,229,180 | B2 | * | 6/2007 | Portmann ...................... 362/16 |
| 2005/0166950 | A1 | * | 8/2005 | Grady, II ...................... 135/75 |

(Continued)

FOREIGN PATENT DOCUMENTS

| CN | 88201355 | 10/1988 |
|----|----------|---------|
| CN | 1661459  | 8/2005  |

(Continued)

OTHER PUBLICATIONS

PCT Search Report and Written Opinion for International Application No. PCT/EP2012/053780 dated Nov. 7, 2013. 7 pages.

(Continued)

*Primary Examiner* — Donald Raleigh
(74) *Attorney, Agent, or Firm* — Michael Best & Friedrich LLP

(57) ABSTRACT

The invention relates to a folding reflector (1) having shade spokes (5) that are annularly hinged on a bearing body (7), by which spokes a reflecting cover (3) can be mounted. The reflector is characterized in that the ends of the shade spokes (5) that turned toward the linkage thereof extend beyond said linkage respectively and in that, due to the effect on said sections (9) of the shade spokes (5) extending beyond the linkage, said sections can be moved into the mounting position and back.

26 Claims, 16 Drawing Sheets

(56) References Cited

U.S. PATENT DOCUMENTS

2008/0137352 A1 6/2008 O'Brien et al.
2010/0177520 A1* 7/2010 Briese .......................... 362/347

FOREIGN PATENT DOCUMENTS

| JP | 2029030 | 2/1990 |
| JP | 2003-135117 | 5/2003 |
| WO | 8200545 A1 | 2/1982 |

OTHER PUBLICATIONS

Chinese Patent Office Action for Application No. 2012800202193 dated Aug. 21, 2015 (13 pages, English translation included).

Japanese Patent Office Action for Application No. 2014-506800 dated Sep. 29, 2015 (11 pages, English translation included).

\* cited by examiner

FOLDING REFLECTOR

CROSS REFERENCE TO RELATED APPLICATIONS

This application claims priority under 35 U.S.C. §119 to PCT Application Number PCT/EP2012/053780 filed Mar. 6, 2012 the entire contents of which are hereby incorporated by reference herein.

BACKGROUND

The present invention relates to a folding.

A folding reflector similar to the kind discussed herein is known, for example, from DE 20 2004 001 528 U1. The reflector can be opened like an umbrella and has ribs articulated in a circle on a bearing body, by means of which ribs a reflecting canopy is arranged to be opened. The reflector serves in particular for the reflection of electromagnetic waves and especially light waves and/or sound waves. Such reflectors are used, for example, in photography for lighting purposes. For mobile use, the umbrella-like structure having ribs enables the reflector to be collapsed for the purpose of transport and opened at the site of use. Opening the umbrellas is frequently laborious and requires the application of a not inconsiderable amount of force, which is a disadvantage particularly in the case of relatively large umbrellas.

SUMMARY

The objective of the present invention is therefore to construct a folding reflector similar to the kind mentioned at the beginning in such a way that it can comfortably be opened and collapsed again by a single person, this being the case irrespective of the size of the umbrella or reflector. Above all it should be possible for the folding reflector to be opened and collapsed again without the application of a large amount of force.

The above-mentioned problem is solved by a folding reflector having ribs which are articulated in a circle on a bearing body, the ribs enabling a reflecting canopy of the reflector to be opened to its full size. The folding reflector is distinguished by the fact that the ribs, at the ends facing their articulation site, each extend beyond that articulation site and that by the exertion of an effect on those portions of the ribs extending beyond the articulation site the ribs are movable into the open position and vice versa.

A key aspect of the invention is therefore that it is possible to dispense entirely with the use of bracing ribs which are customarily connected to the ribs for opening purposes, as shown, for example, in DE 20 2004 001 528 U1. As a result, an "umbrella shaft" acting as support for the bracing ribs is likewise unnecessary and instead the present invention employs an opening mechanism completely different from that in the prior art, namely a mechanism which effects opening of the umbrella by provision of means for exerting a force effect on portions of the ribs that extend beyond the articulation site of the ribs in the bearing body, that force effect being exerted by way of the side of the bearing body located opposite the canopy of the reflector. Consequently, in order to open the reflector umbrella it is necessary merely to provide a suitable mechanism for exerting an effect on the portions of the ribs extending beyond the bearing body, which mechanism can be constructed in various ways. As a result, bracing ribs and an umbrella shaft are unnecessary, and so the reflector umbrella is easy to open and the amount of force required for that purpose can be reduced to a minimum. Furthermore, the reflector is consequently more economical to produce and accessories can be connected to the reflector in a considerably more flexible way. Above all, an opening mechanism without bracing ribs makes it possible to move a light source right into the apex of the umbrella and so, if the umbrella has a parabolic shape, short focal lengths can be set. Preferably, the focal point of the opened umbrella is located slightly in front of the apex of the umbrella, so that the light source can, if necessary, also be displaced beyond the focal point in the direction towards the apex of the umbrella, if this should be required photographically.

In a first embodiment of the invention, it is possible, for example, to provide a pressure plate, which is especially in the form of a pressure ring, for exerting an effect on the portions of the ribs projecting beyond the bearing body, the pressure plate or pressure ring and the bearing body being displaceable relative to one another. By reducing the spacing between the bearing body and the pressure plate, a force in the direction of the bearing body can be exerted on the portions of the ribs that project beyond the bearing body, which portions are preferably arranged, especially clamped, between the bearing body and the pressure plate. As soon as a force is exerted on the projecting portions of the ribs in the direction of the bearing body, the portions of the ribs are moved/turned in the direction of the bearing body, with the result that a rotational movement of the ribs radially inwards about the articulation point in the bearing body is effected and so the reflector can therefore be moved into its opened functional position.

In order to bring about the relative displacement between the pressure plate and the bearing body, that is to say, in particular, to vary the spacing between those two elements, an actuating device can be provided which particularly comprises a guide bolt which is joined on the one hand to the bearing body and on the other hand to the pressure plate in such a way that activation of the actuating device brings about displacement of the pressure plate along the guide bolt in the direction of the bearing body. In this embodiment the bearing body is joined in fixed position to the guide bolt. Furthermore, the actuating device can have a manually operable lever which effects displacement of the pressure plate. It will be understood that all actuating means can also be electrical, so that the effect on the projecting rib portions is exerted automatically, i.e. mechanically, "at the press of a button". Preferably, a plurality of manual actuating devices are provided, each actuating device being associated with a plurality of projecting rib portions. As a result, the force to be applied by a user is reduced to a minimum. Furthermore, exerting an effect on the rib portions by means of a pressure plate improves ease of handling of the reflector in comparison with conventional openable reflectors.

The relative displacement between the pressure plate and the bearing body can advantageously also be effected by means of a mechanical actuating device and especially by means of an electromagnetic, pneumatic or hydraulic drive means.

The bearing body of the reflector is preferably annular, that is to say in the form of a bearing ring, and according to the invention can preferably be designed to receive an adapter element, especially an adapter flange for attaching accessories, especially for photography, to the reflector. Furthermore, it is possible for such an adapter element to be formed in one piece with the bearing body.

The accessories that can be attached to the adapter element can be, for example, lighting devices, focus holding means or like accessories for photography. In principle, however, it is also possible for at least parts of a sound system, such as, for example, loudspeakers or similar accessories, to be connected at least indirectly to the adapter element. The adapter element is preferably annular and consequently has a central aperture; the outer diameter of the adapter element preferably corresponds to the inner diameter of the bearing ring and the inner diameter or, in more general terms, the inner cross-sectional shape of the adapter element can match the particular associated accessory to be attached. As a result, the reflector can be used flexibly for virtually any conceivable purpose and can be connected quickly and easily to any desired accessory.

Preferably, a rod-like support for a light source extends through the bearing body so as to be longitudinally displaceable, the rod-like support preferably being attached to the bearing body and especially to the adapter element as an accessory. The rod-like support extends through the bearing body in such a way that the light source can be displaced axially inside the umbrella canopy, that is to say preferably in the direction of the longitudinal centre axis of the opened reflector umbrella. If the light source is arranged on the end-face end of the rod-like support, it can be located on the longitudinal centre axis of the opened reflector. It is especially advantageous for the light source to be mounted so as to be longitudinally displaceable on the rod-like support, that is to say that, in principle, it is able to assume any desired position in the reflector along the longitudinal centre axis of the opened reflector.

As already mentioned above, in the first embodiment of the invention the portions of the ribs that extend beyond the articulation site on the bearing body are arranged and preferably clamped between the bearing body and the pressure plate or pressure ring in such a way that they retain their articulation on the bearing body both in the opened state and in the collapsed state of the reflector umbrella, so that the reflector or the ribs are prevented from accidentally slipping out of the bearing body.

The bearing body is preferably annular and has slots for the articulation of the ribs, which slots are arranged radially in the bearing body and are open towards the peripheral face of the bearing body. The articulation of the ribs on the bearing body is in this way particularly simple and in principle does not require any additional fastening means, although it is, of course, possible for such means to be provided for safeguarding the articulation of the ribs in the bearing body.

In a further embodiment of the invention, the effect exerted on the portions of the ribs extending beyond the articulation site thereof in the bearing body can be brought about by a cable, rope or the like which acts on the free ends thereof and by means of which the said portions can be pulled radially inwards. Preferably, in that case each projecting portion of a rib is associated with a rope, cable or the like. It is also possible in principle, however, to connect all projecting portions of the ribs to a single cable, rope or the like, so that one pull on the rope, cable or the like brings about an effect, especially causes a force to be exerted on the portions of the ribs projecting beyond the bearing body which are consequently pivoted in the direction of the interior of the bearing body. Pivoting or rotational movement of the projecting portions of the ribs in the direction of the interior of the bearing body has, in turn, the result that the portions of the ribs associated with the canopy pivot radially outwards, so that the reflector is therefore moved into its open position. The ribs can be fixed in the open position by suitable means.

In order that the ribs can be reliably articulated in the bearing body and prevented from slipping out and in order, furthermore, to ensure that an optimum effect is exerted on the portions of the ribs protruding beyond the bearing body, the portions in question have an enlarged diameter relative to the remainder of the ribs. The enlarged diameter of the ribs in the region of the projecting portions can be created integrally as early as during production of the ribs, or alternatively an additional element, for example a sleeve or the like, can be joined, especially clamped, adhesively bonded or screwed, to the portions of the ribs projecting beyond the bearing body.

Finally, the bearing body can be attached to a stand. Alternatively or in addition, the folding reflector can have fastening means by means of which it can be suspended, especially from a ceiling. It is also possible for the reflecting canopy to have seams for receiving the ribs on its outer side. The reflector can have at least 8 or 12, especially 16, preferably 24 ribs. In principle, however, any other desired number of ribs can be provided. The ribs themselves are preferably made of glass-fibre-reinforced plastics, of carbon-fibre-reinforced plastics and/or of metal, especially of steel.

In an advantageous embodiment of the invention, the actuating device can bring about displacement of the pressure plate along a threaded bolt. The actuating device for displacing the pressure plate is then preferably in the form of a manually operated or motor-driven planetary gear.

Furthermore, in a different embodiment the actuating device can have a guide tube having an external thread, which guide tube is non-rotatably joined to the bearing body and co-operates with the internal threaded portion of a tubular element that is rotatably joined to the pressure plate. The tubular element is preferably rotatable by means of a handle. Mechanical operation of the tubular element, especially by means of an electric motor, is also possible in principle, however.

BRIEF DESCRIPTION OF THE DRAWINGS

The invention will be described in greater detail below with reference to the drawings wherein.

DETAILED DESCRIPTION

Figure 1:
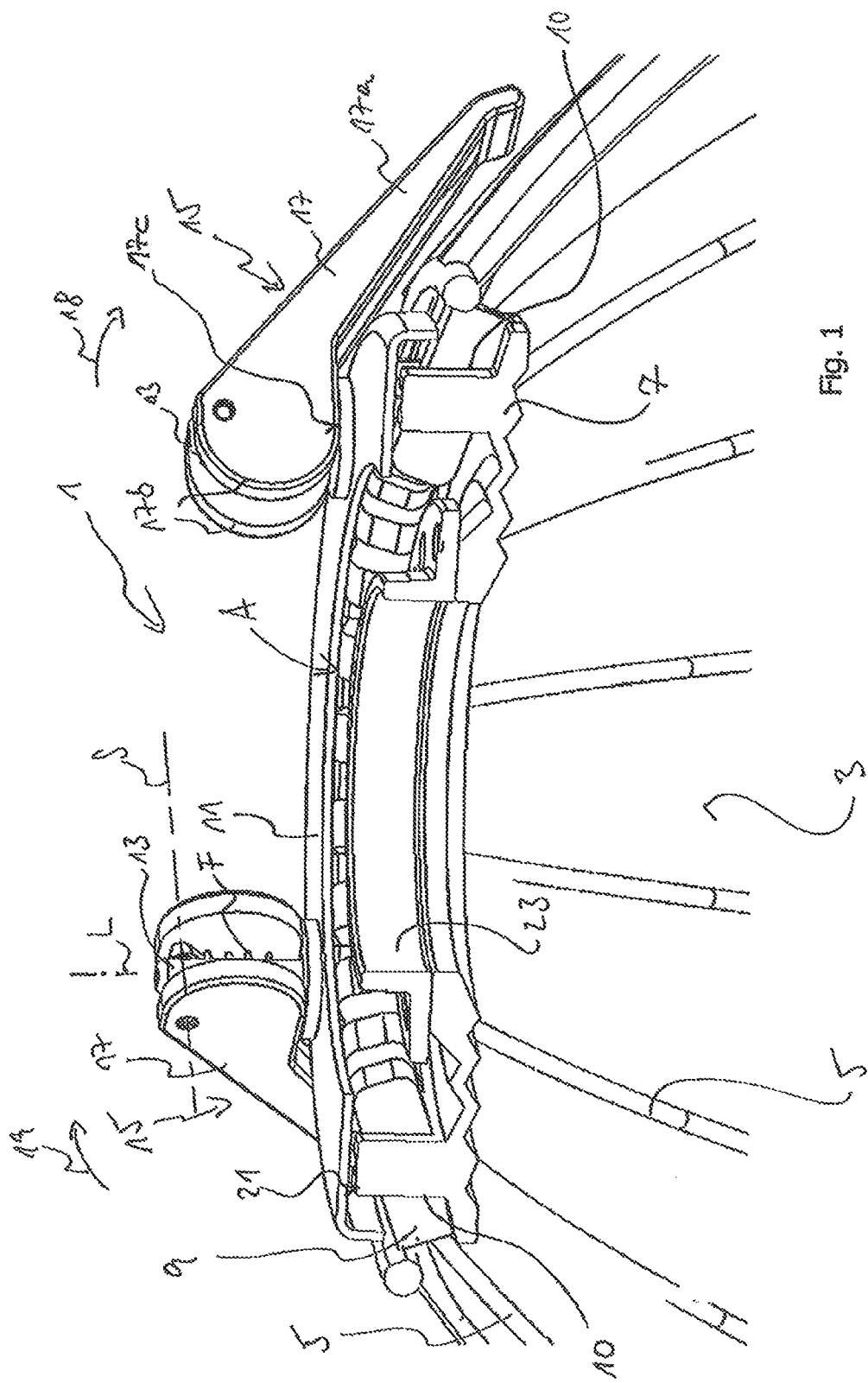
FIG. 1 is a sectional view of the folding reflector in the open position.

FIG. 1 shows a perspective sectional view of a folding reflector 1, referred to simply as the reflector hereinbelow, in the opened state (open position) in accordance with one embodiment of the invention. The reflector 1 comprises a reflecting canopy 3 which is arranged to be opened with the aid of ribs 5. For attaching the ribs 5 to the reflecting canopy 3, the canopy can have seams for receiving the ribs 5, for example, on its outer side. In principle, however, the ribs 5 can also be mounted on the canopy 3 in some other way. In particular, fastening means, especially loops, preferably rubber loops, for attaching the ribs can also be provided on the inner side of the canopy. The ribs 5 are articulated on a bearing body 7, which in this case is in the form of a bearing ring, and have, at the ends facing their articulation site, portions 9 that extend beyond the articulation site, which portions are in the form of rib articulation heads or have such rib articulation heads. The rib portions 9 therefore extend beyond the side of the bearing body 7 opposite the canopy 3 and form articulation heads which allow the ribs 5 to pivot relative to their articulation point in the bearing body 7.

In the embodiment shown in FIG. 1, the bearing body 7 is annular and comprises radially extending slots 10 which are shown only by way of indication in FIG. 1. The radial slots 10 enable the ribs 5 to be articulated in a circle on the bearing body 7 and they are open towards the peripheral face of the bearing body 7 to facilitate receiving the ribs 5. As a result of the articulation of the ribs 5 on/in the bearing body 7, the ribs are rotatably mounted and thus in principle allow displacement of the ribs 5 from a collapsed position to the opened position shown in FIG. 1.

For the articulation of the ribs 5 in the bearing body 7, instead of the radial slots it is also possible to provide bores arranged in a circle on or in the bearing body, especially through-bores in the bearing body 7 that are elongate in the radial direction, which bores provide a connection between the side of the bearing body 7 facing the canopy 3 of the reflector 1 and the side of the bearing body 7 remote from, or opposite, the canopy 3 of the reflector 1. In principle, however, there are also other possible ways of effecting articulation of the ribs 5 on the bearing body 7 in such a way that the ribs 5 are able to pivot into their open position and vice versa.

In the embodiment of the invention shown in FIG. 1, a force effect is exerted on the projecting portions 9 of the ribs 5 by a pressure plate and especially by a pressure ring 11, which in this case, by way of example, has substantially the same outer diameter as the bearing body 7. The pressure ring 11 is arranged substantially parallel to the bearing body 7, more specifically on the side of the bearing body 7 opposite the canopy 3. Furthermore, the pressure ring 11 is joined to the bearing body 7 by way of a plurality of guide bolts 13.

The bearing body 7 and the pressure ring 11 are movable relative to one another, so that the spacing between them can therefore be altered. Displacement of the pressure ring 11 can be effected by means of an actuating device 15 which co-operates with or comprises the guide pin 13. The guide pin 13 is on the one hand fixedly joined to the bearing body 7 and on the other hand passes through the pressure ring 11. A lever 17 (tensioning lever) is pivotally mounted on the end of the guide bolt 13 opposite the bearing body 7. The lever 17 can be pivoted manually about a pivot axis S which is aligned substantially perpendicularly to the longitudinal axis L of the guide bolt 13.

The lever 17 has a handle portion 17a and a cam portion 17b. By means of the handle portion 17a, a user is able to pivot the lever 17 about the pivot axis S radially outwards relative to the bearing body 7 (see arrows 18). As a result, the curve-like or worm-like, i.e. eccentric, projection of the lever 17 forming the cam portion 17b is pressed onto the pressure ring 11 in such a way that, on further pivoting of the lever 17 in the direction to arrow 18, the pressure ring is displaced further and further in the direction of the bearing body 7 along the guide bolt 13. In FIG. 1 the lever 17 is shown in its final pivoted position in which a detent face 17c of the lever 17 rests on the pressure ring 11 or on a suitable, preferably annular, intermediate element. When all levers 17 present are in that final pivoted position, the reflector 1 is in its open position.

Figure 2:
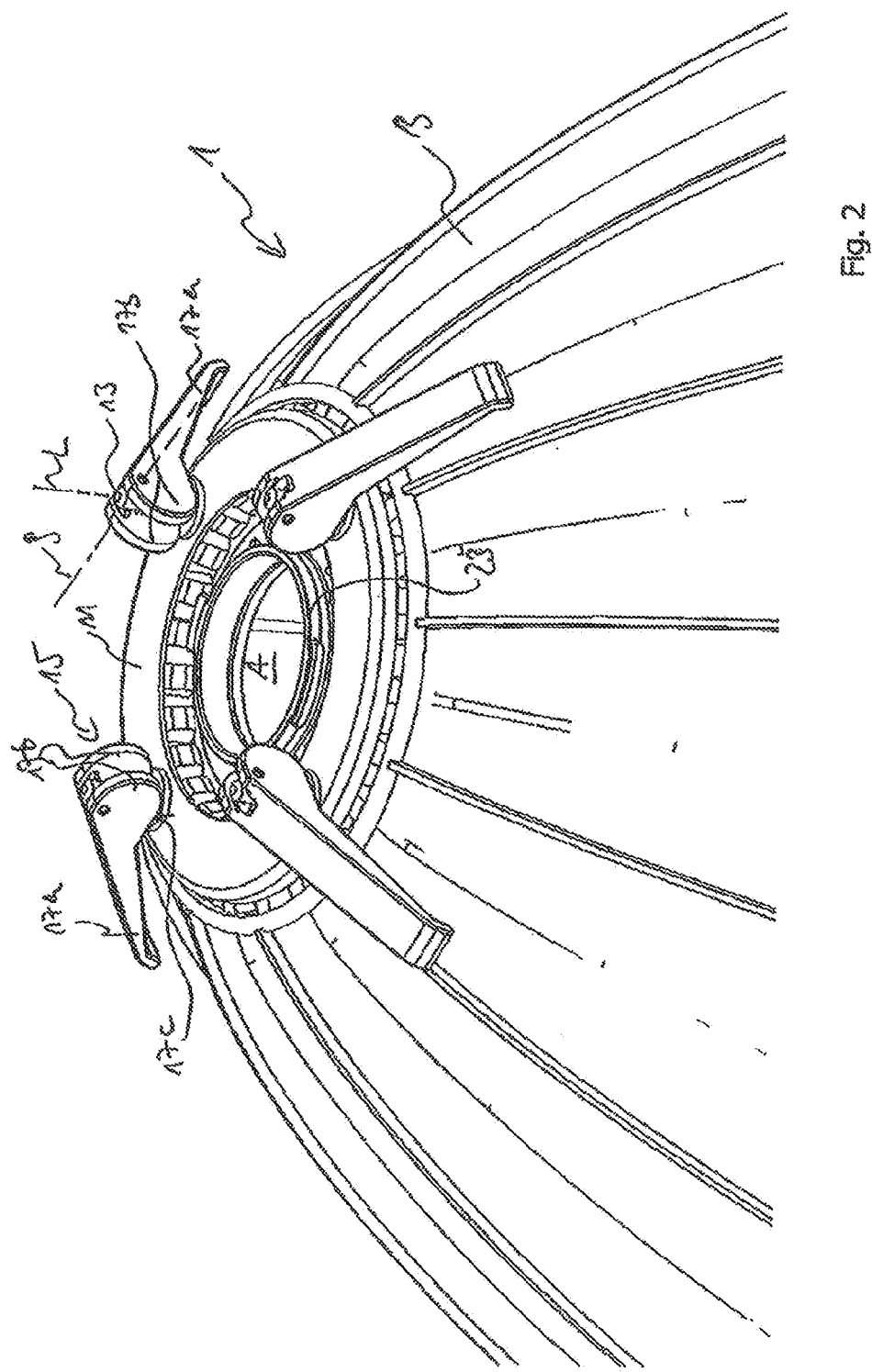
FIG. 2 is a perspective rear-side view of the folding reflector in the open position.

FIG. 2 is a perspective view of the reflector 1 in its open position. When the reflector 1 is in the open position shown in FIG. 2, the levers 17 are in their final pivoted position in which the handle portions 17a are arranged substantially parallel to the ribs 5. In this final pivoted position of the lever 17, the cam portion 17b presses the pressure ring 11 the maximum distance in the direction of the bearing body 7. The spacing between the pressure ring 11 and the bearing body 7 is minimal in the open position of the reflector 1 shown in FIG. 1 and FIG. 2. In particular, in the open position the pressure ring 11 rests almost on top of the bearing body 7.

Preferably, each actuating device 15 is associated with a plurality of ribs 5, that is to say the operation of a single pivot lever 17 or an actuating device 15 causes a plurality of the ribs 5 present to be displaced into their open position. FIG. 2 shows a total of four actuating devices 15. It will be understood that the number of actuating devices 15 can vary, and in particular more than or fewer than four actuating devices 15 can be provided.

As mentioned, by pivoting the lever 17 in the direction of arrow 18, i.e. radially outwards relative to the bearing body 7, the pressure plate 11 is pressed in the direction of the bearing body 7. During the displacement of the pressure ring 11, a force is exerted on the portion 9 of the articulated ribs 5 in such a way that the ribs 5 are pivoted in the articulation point of the bearing body 7, with the result that the ribs 5 rotate radially inwards relative to the bearing body 7, that is to say in the direction of arrows 19, about the articulation point. As a result, the ribs 5 are displaced into their open position and are fixed in the open position with the aid of the detent face 17c of the lever 17.

Figure 3:
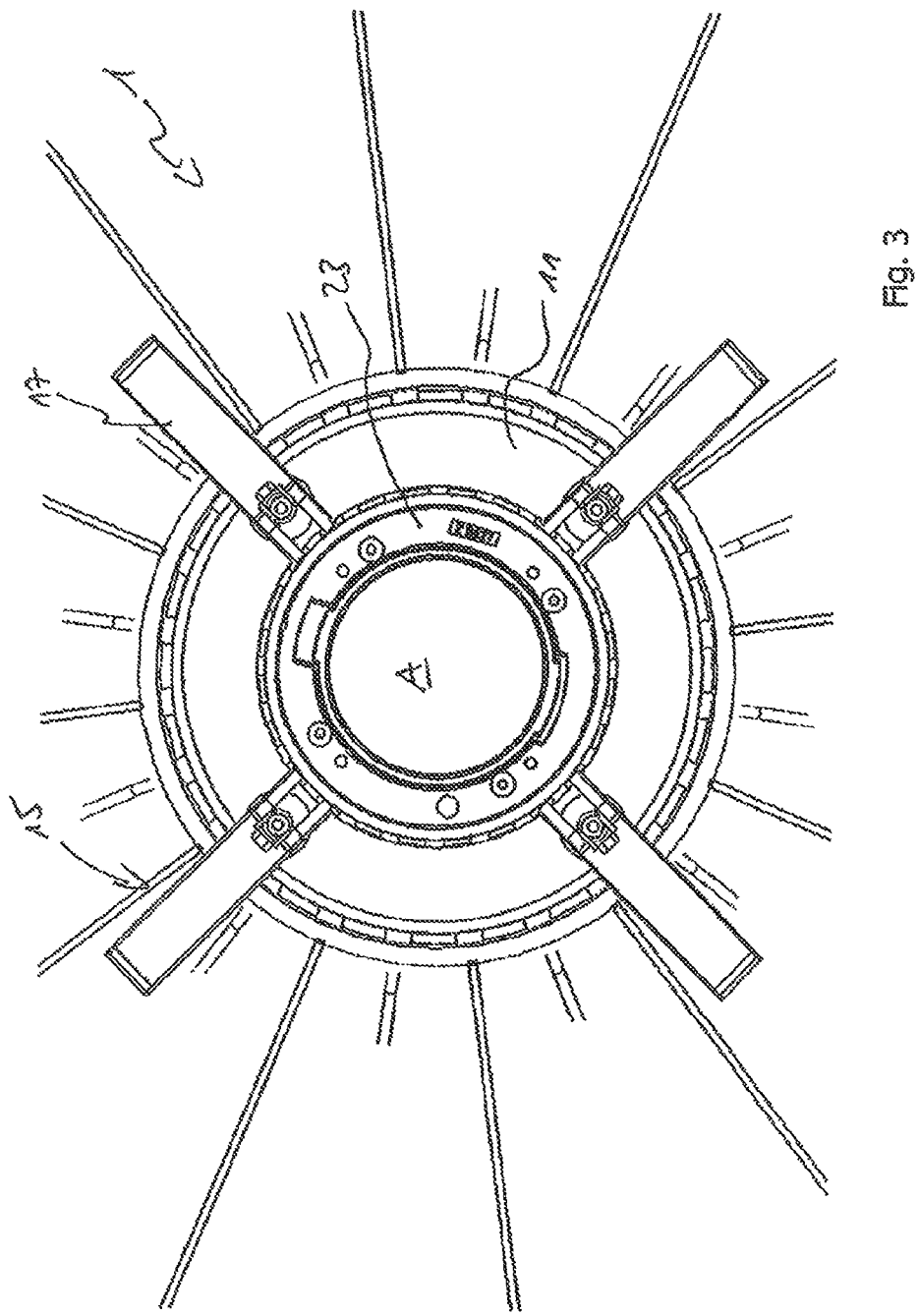
FIG. 3 is a rear-side view of the folding reflector in the open position.

FIG. 3 shows a rear-side view of the reflector 1. It will be clear that the bearing body 7 forms an opening A into which a preferably annular adapter element 23 is insertable. The adapter element 23 can be screwed, welded or adhesively bonded to the bearing body 7 or joined thereto in some other way. In principle it is also possible to form the bearing body 7 in one piece with an adapter element 23. The adapter element 23 serves for receiving or detachably attaching any desired accessory component (not shown in FIG. 1 and FIG. 2), as will be explained in greater detail below.

Figure 6:
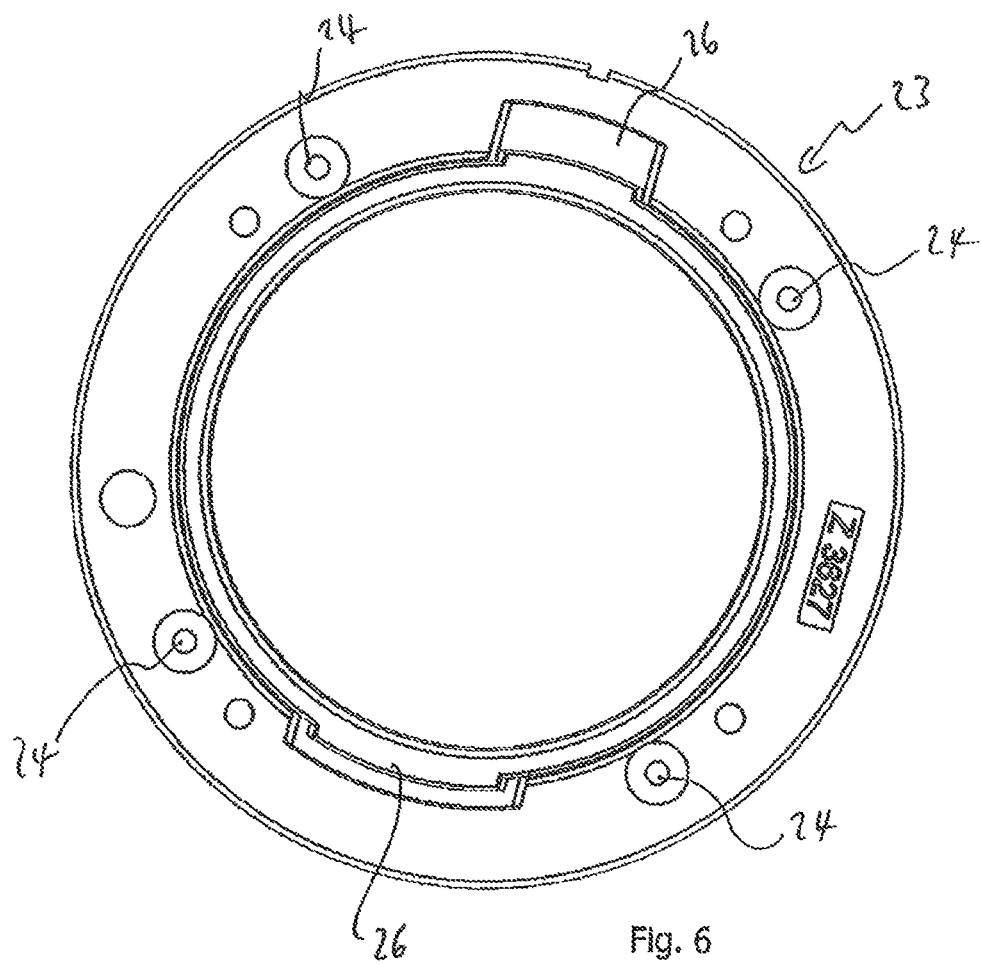
FIG. 6 is an end-face view of an adapter element.

FIG. 6 shows an end-face view of the adapter element 23. In the present exemplary embodiment the adapter element 23 has, purely by way of example, a plurality of holes 24 for screwing the adapter element to the bearing body 7, the bearing body having corresponding apertures for receiving the screws. As a result, the adapter element as a whole is exchangeable, so that different adapter elements can be used for different accessory components to be attached to the reflector.

Figure 7:
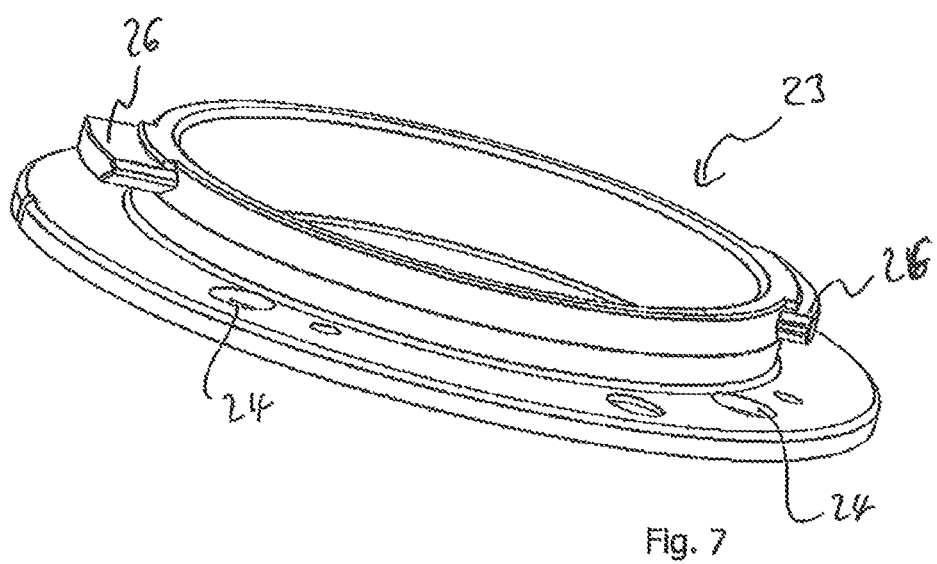
FIG. 7 is a perspective view of the adapter element according to FIG. 6.

FIG. 7 shows a perspective view of the adapter element 23. It will be seen that the adapter element has, purely by way of example, two rotationally symmetrically arranged projections 26 which serve for attaching an accessory component, for example a lighting device, in a similar way to a bayonet closure.

Figure 4:
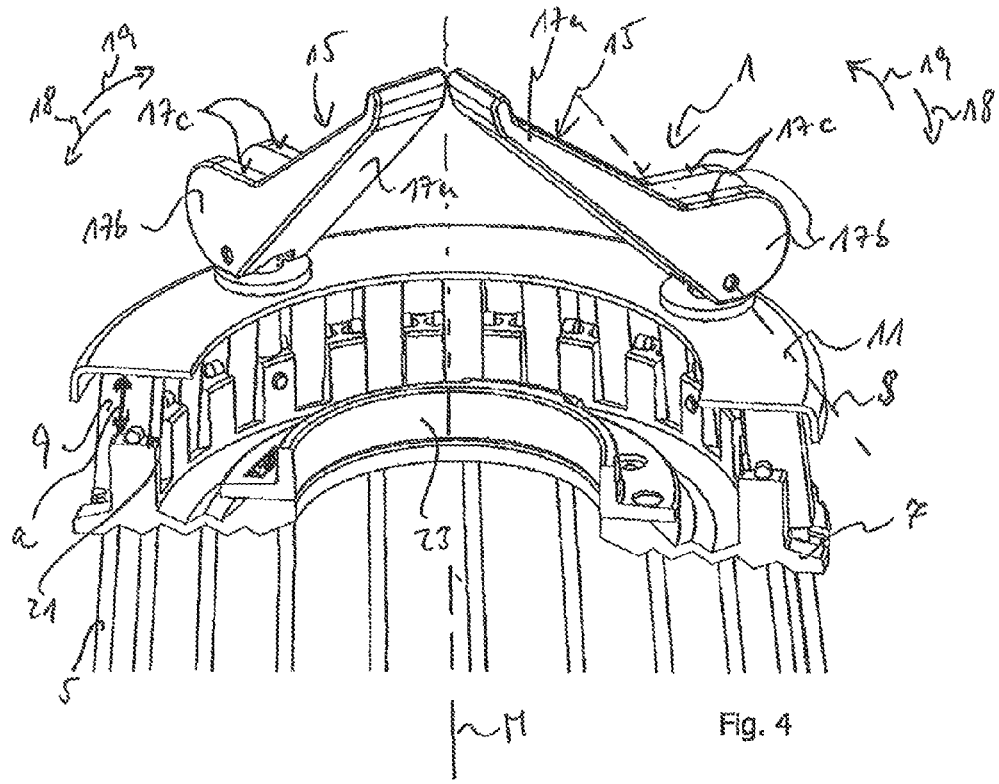
FIG. 4 is a diagrammatic sectional view of a folding reflector in the collapsed state.
Figure 5:
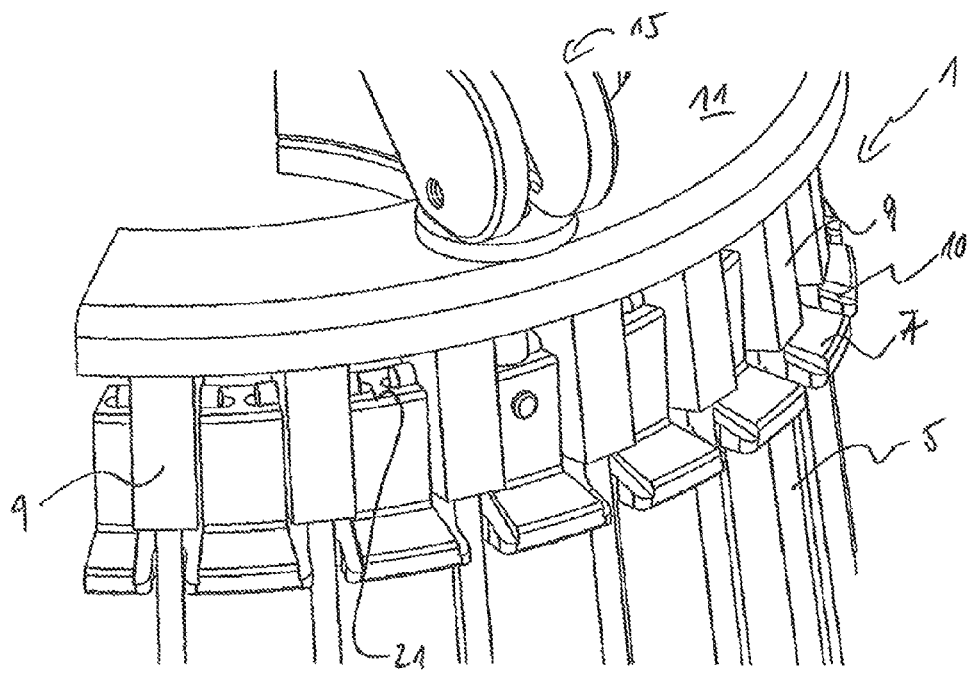
FIG. 5 shows a detail of the folding reflector in the collapsed state.

FIG. 4 and FIG. 5 show the reflector 1 according to the invention in a collapsed state. Identical parts have been given identical reference symbols and so in that regard reference is made to the description relating to FIG. 1 in order to avoid repetitions.

In contrast to the open position shown in FIG. 1, the lever(s) 17 in FIG. 4 is(are) in a pivoted position in which the pressure ring 11 has no effect or only a negligible effect on the portion 9 of the ribs 5. In order to apply a certain amount of bias to the pressure ring 11 to facilitate the opening operation, a biasing element can be provided between the pressure ring 11 and the pivot lever 17. The biasing element in this case is, by way of example, in the form of a compression spring F and can be seen at least by way of indication in FIG. 1. In order to pass from the final pivoted position shown in FIG. 1 (e.g., the open position of the reflector 1) to the pivoted position shown in FIG. 4 (e.g. the collapsed state of the reflector 1), the handle portion 17a must be pivoted about its pivot axis S in the direction of arrow 19, that is to say radially inwards relative to the bearing body 7.

In the functional position shown in FIG. 4, the spacing a of the pressure ring 11 from the end face 21 of the bearing body 7 in the direction of the centre axis M of the reflector 1 is significantly greater than in FIG. 1. In this functional position, therefore, no clamping force or only a very small clamping force is exerted on the portion 9 of the ribs 5 projecting beyond the bearing body 7. As a result of the reduced effect on the portions 9, the ribs 5 are able to pivot in the articulation point in the direction of arrows 18, that is to say radially outwards relative to the bearing body 7. The reflector 1 is then in its collapsed functional position in which it is transportable.

It will be understood that the embodiment of the invention shown in the Figures is purely exemplary and in principle it is also possible to provide motor-driven/mechanical displacement of the pressure ring 11 in the direction of the bearing body 7 in order to exert a pressing or pulling force on the portions 9 of the ribs and corresponding means. In particular, the displacement of the pressure ring 11 can also be effected by hydraulic, pneumatic, electric and especially electromagnetic means.

In very general terms it is possible, independently of the pressure ring in accordance with the first exemplary embodiment of the invention, for the effect exerted on the projecting portions 9 for displacing the reflector 1 into its open position and vice versa to be produced pneumatically, hydraulically or electrically, especially mechanically by means of an electromagnetic actuator. In the case where the portions 9 are acted upon mechanically it is preferable for corresponding energy supply devices, such as, for example, a battery, a power terminal or the like, to be present.

If, in accordance with a different exemplary embodiment, the effect exerted on the portions 9 of the ribs 5 extending beyond the articulation site thereof in the bearing body 7 is brought about by a cable, rope or the like which acts on the free ends of the portions 9 and by means of which the said portions can be pulled radially inwards, the operation of the cable, the rope or the like can likewise be effected manually or mechanically. For example, it is possible to provide a motor-driven or manually operable rope winch or similar actuating device mounted, for example, on the bearing body 7 or formed integrally therewith. In principle it is also possible for each projecting portion 9 and the cable, rope or the like connected thereto to be provided with its own associated "miniature rope winch", especially driven by an electric motor.

In a further advantageous exemplary embodiment of the invention, the effect exerted on the portions 9 of the ribs 5 extending beyond the bearing body 7 could be brought about by electromagnetic means, especially in a similar way to a relay or contactor, and especially by one or more magnetic clamp(s) or lifting magnet(s), by arranging in the bearing body 7 one or more coil bodies which, in the energised state, attract the portions 9 by means of a magnetic force in such a way that the ribs 5 are displaced about their articulation point in the bearing body 7 into their open position. When the coil bodies are in the non-energised state, the ribs 5 can then assume their collapsed state. In this embodiment, therefore, the bearing body 7 and the portions 9 together form an electromagnetic actuator.

What is important is simply that an effect is exerted on the portions 9 projecting beyond the articulation site in the bearing body 7 in such a way that as a result of that effect the ribs 5 are movable into an open position and vice versa. Basically, therefore, the reflector 1 in accordance with the invention is opened as a result of the portions 9 being acted upon in such a way that the ribs 5 are pivoted about their articulation point in the bearing body 7 (in this case: slots 10) radially inwards relative to the bearing body 7.

FIGS. 1, 4 and 5 also make it clear that the portions 9 have a larger diameter than the remaining portion of the ribs 5, which, on the one hand, is intended to prevent the ribs 5 from being able to slip out of their bearing position in the bearing body 7 and, on the other hand, offers a larger surface area for exertion of an effect on the portions 9. As already explained at the beginning, the larger diameter can be produced in a variety of ways.

Figure 8:
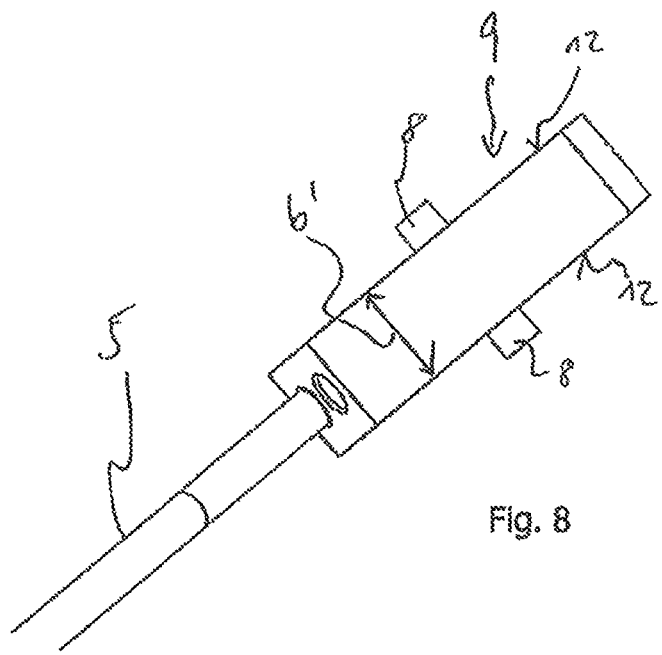
FIG. 8 shows the underside of a rib articulation head.
Figure 9:
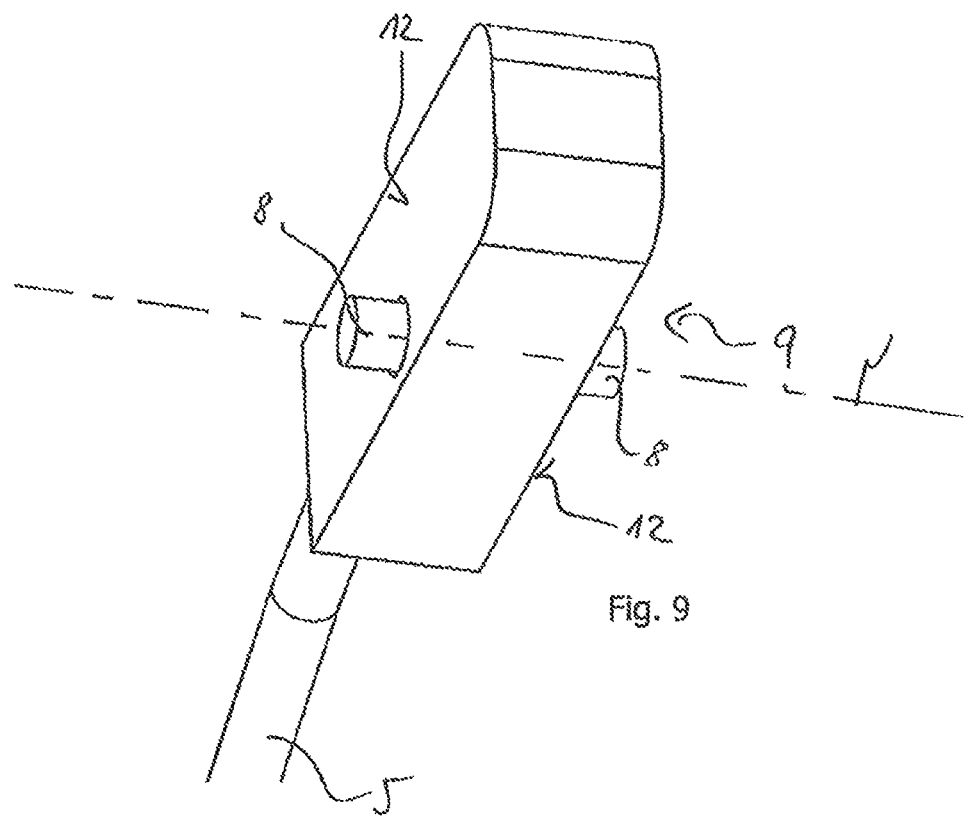
FIG. 9 is a perspective view of the rib articulation head according to FIG. 8.

FIGS. 8 and 9 show a detailed view of a rib 5 having an enlarged projecting portion 9. The portion 9 has two shaft portions 8 which are preferably formed in one piece with the portion 9. The shaft portions 8 are arranged perpendicular to opposing side faces 12 of the portion 9 and serve for mounting the ribs 5 in the bearing body 7. The two shaft portions 8 are therefore located on a common axis and in this way form a rotational axis D. The portion 9 of a rib 5 thus acts as a movably mounted force-transmission element or as a pressure element.

Figure 10:
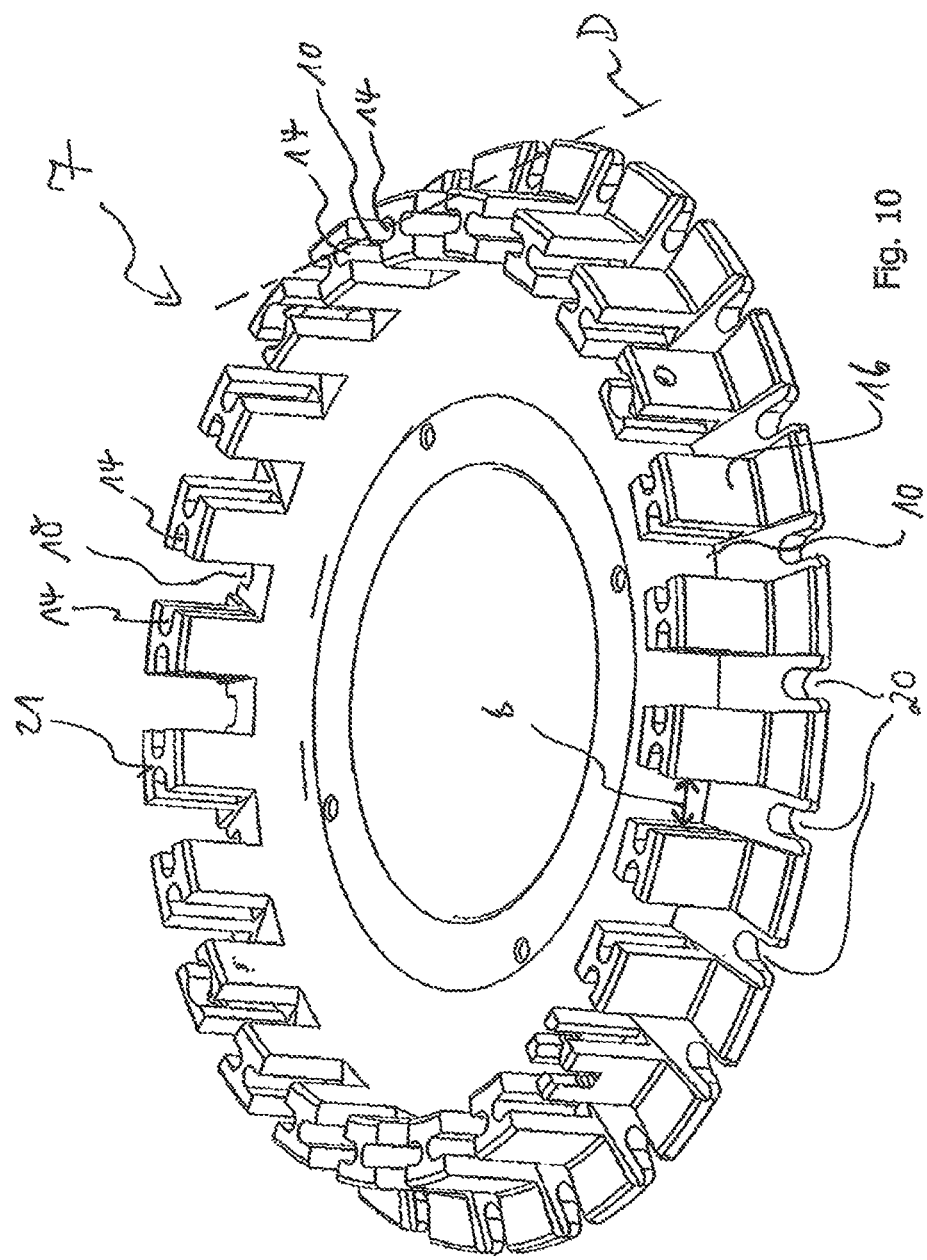
FIG. 10 is a perspective view of the bearing body.

The shaft portions 8 of the projecting portion 9 are designed to be received in correspondingly shaped recesses 14 in the bearing body 7 which can be seen in FIG. 10. Consequently in each case two recesses 14 form a bearing for two shaft portions 8 of a rib 5. It will be seen that in each case two recesses 14 are in alignment with a slot 10. The recesses 14 are arranged in parallelepipedal solid bearing blocks 16 on the side of the bearing body remote from the canopy 3; that is to say the recesses extend from the end face 21 into the bearing block. Furthermore, an indentation 20 in the rim of the bearing body 7 provides further support for the portion 9 in the bearing body 7, because the indentation 20 is matched to the diameter of the ribs 5 so that the portion 9 of enlarged cross-section cannot slip through the indentation 20. It will be understood, however, that the width b of the slot 10, that is to say the spacing between two bearing blocks 16, must match the width b' of the projecting portion 9. Furthermore, the indentations 20, the slots 10 and the recesses 14 must be arranged or aligned relative to one another in such a way and their dimensions must be such that the reflector 1 can be fully collapsed. In that state the ribs 5 are then aligned substantially perpendicularly relative to the end face 21 of the bearing body 7.

Figure 11:
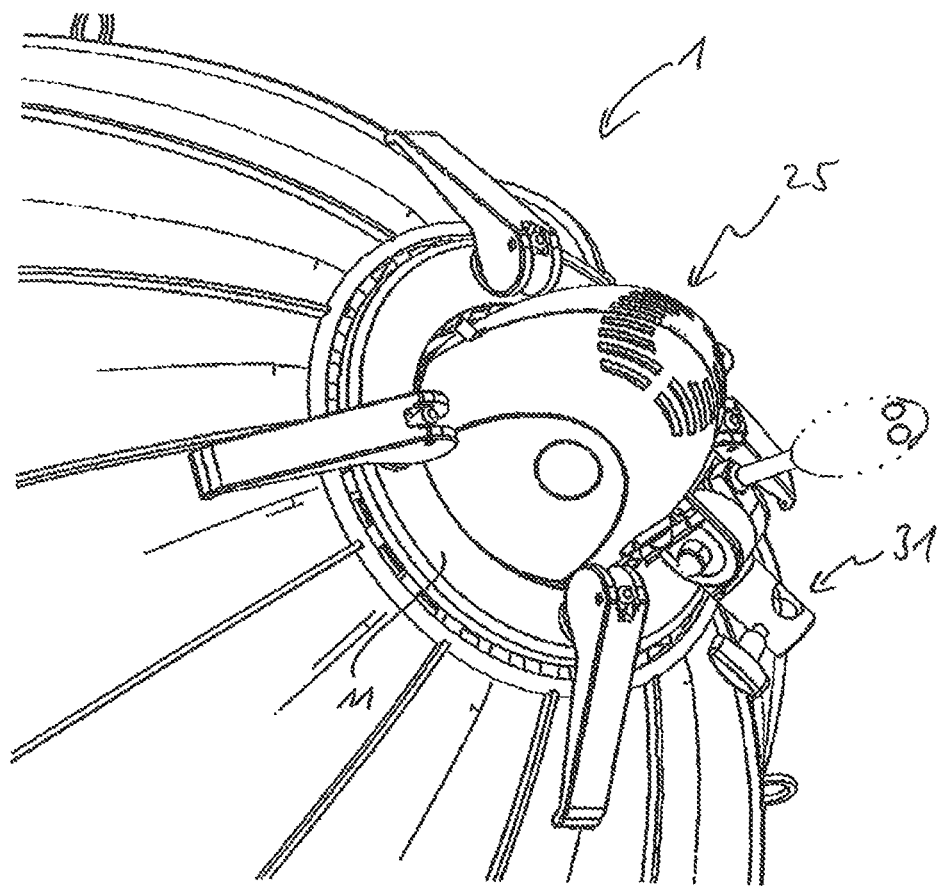
FIG. 11 is a perspective view of the folding reflector with a lighting device attached thereto.
Figure 12:
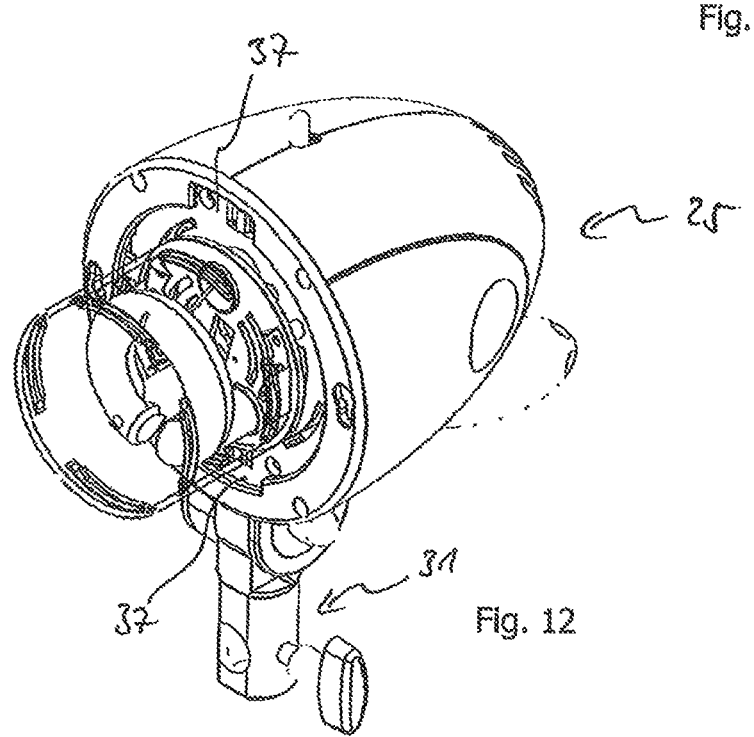
FIG. 12 is a perspective view of the lighting device according to FIG. 11.

FIG. 11 shows a perspective rear view of a reflector 1 provided with an accessory component 25. The accessory component 25 is, by way of example, in the form of a lighting device and projects into the reflector 1 from the rear side thereof. The accessory component 25 is preferably connected to the adapter element 23 of the reflector 1 (FIGS. 6 and 7) and has for that purpose corresponding recesses 37 for receiving the projections 26 of the adapter element 24, as can be seen in FIG. 12.

Figure 13:
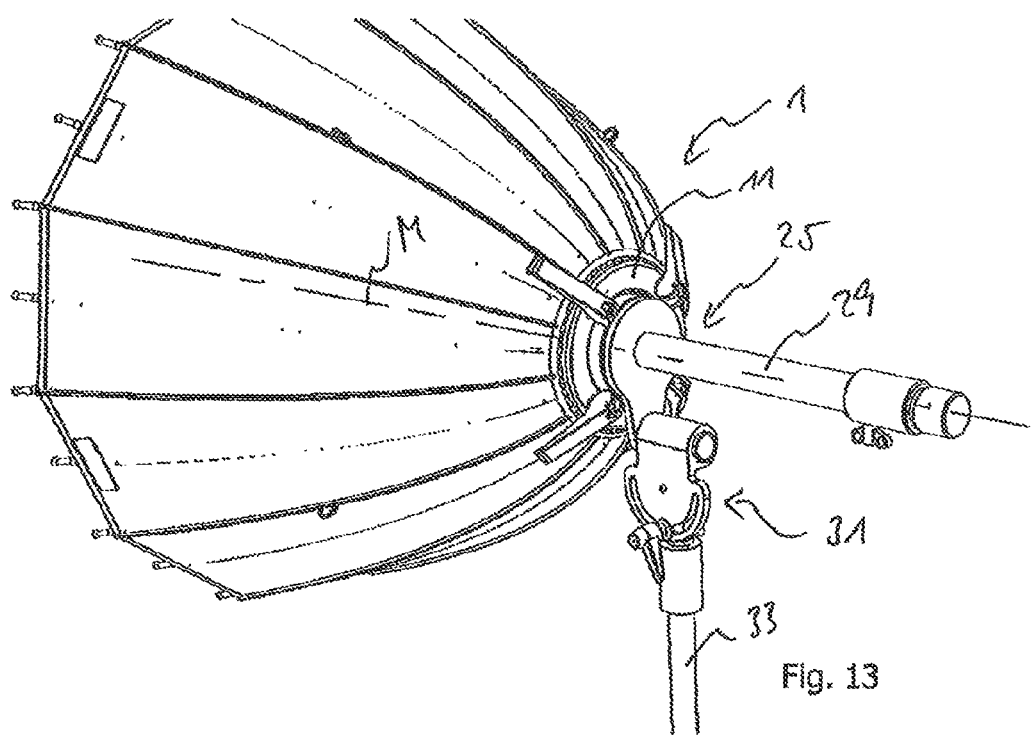
FIG. 13 is a perspective rear-side view of a folding reflector attached to a stand.
Figure 14:
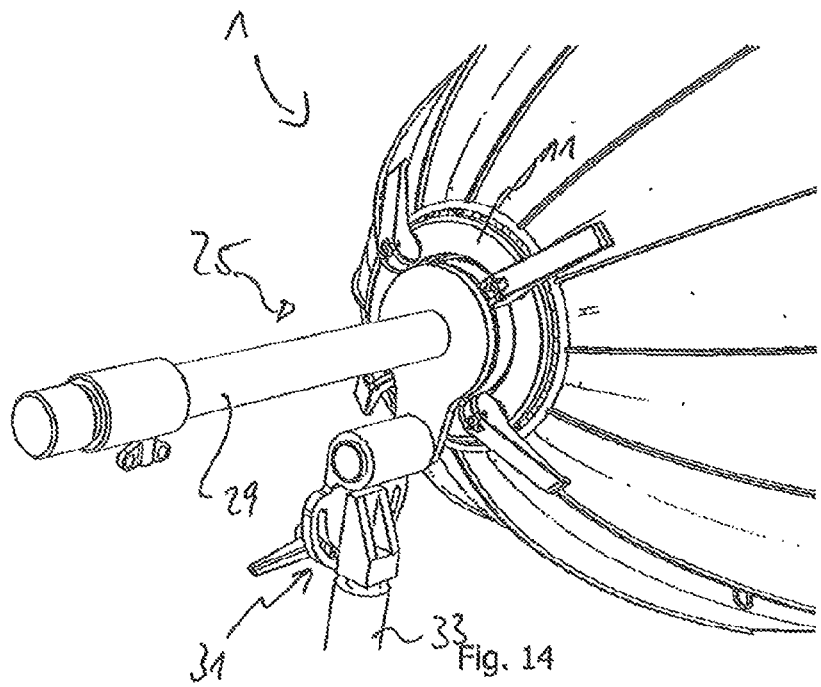
FIG. 14 is a further perspective rear-side view of the folding reflector according to FIG. 13.
Figure 15:
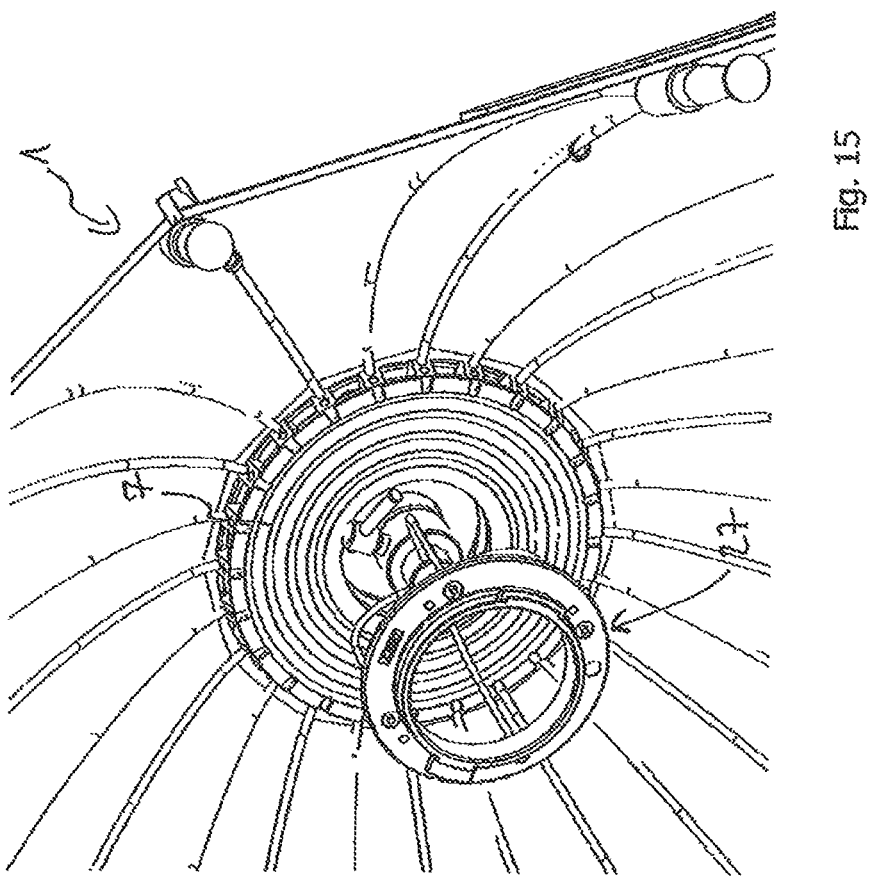
FIG. 15 is a perspective front-side view of the folding reflector having a holding device in the form of an adapter element.

FIGS. 13 to 15 show various perspective views of an opened reflector 1 according to the invention. The reflector 1 is provided with an accessory component 25 which is attached to the adapter element 23 shown in FIGS. 6 and 7. The accessory component 25 is a rod-like support 29, also referred to as a "focus tube", having a holding device 27 joined thereto, it being possible for the rod-like support 29 or the holding device 27 to act as an interface or adapter for receiving different light sources. The light source is then therefore preferably arranged on the holding device 27 at the end-face end of the rod-like support 29, so that it is located on the longitudinal centre axis of the opened reflector 1. The light source is preferably mounted so as to be longitudinally displaceable along the longitudinal centre axis M of the opened reflector 1 by means of the rod-like support 29. Another possibility is to mount the light source, especially by means of the holding device 27, so as to be longitudinally displaceable on the rod-like support 29. In that case the light source, together with the holding device 27, is then preferably mounted so as to be movable on the rod-like support 29.

Adjustable holding means 31 enable the reflector 1 to be connected to a stand 33. The holding means 31 in that case has a stand connecting tube. In addition, the holding means 31 is preferably in the form of an umbrella-tilting element, that is to say in the form of a kind of joint for aligning, especially for vertically and/or horizontally tilting/pivoting, the reflector 1 relative to the stand 33.

Figure 16:
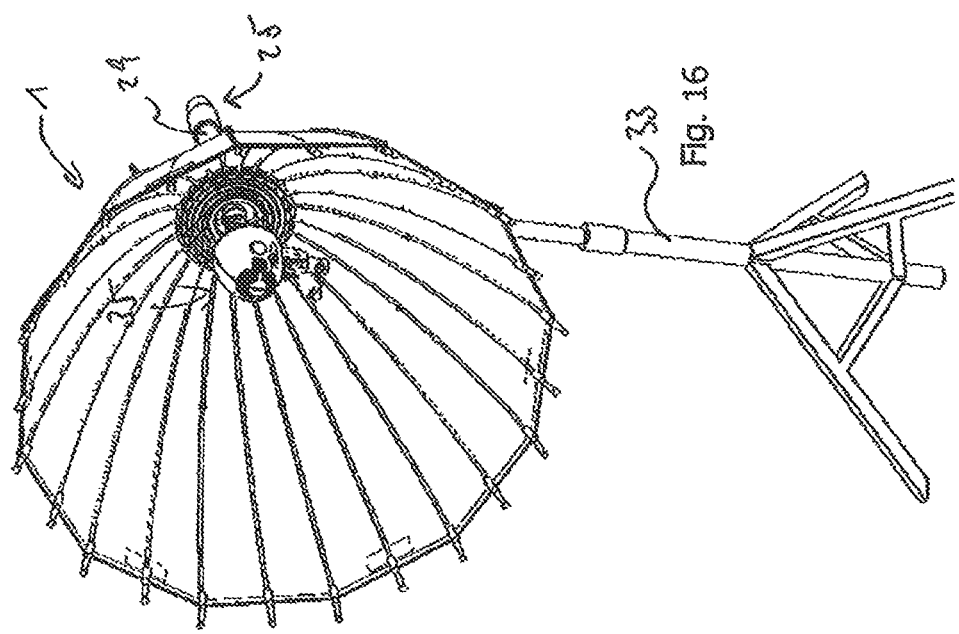
FIG. 16 is a perspective front-side view of the folding reflector having a lighting device attached to the holding device.
Figure 17:
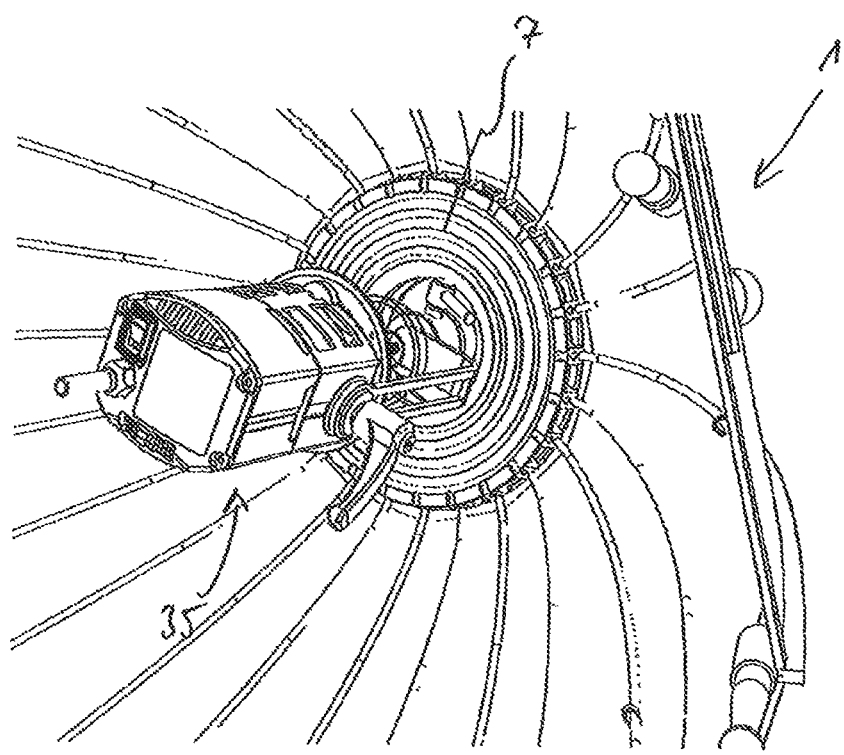
FIG. 17 is a perspective front-side view of the folding reflector having an alternative lighting device.

FIGS. 16 and 17 show further exemplary lighting devices 35 which are connected to the bearing body 7 or to the adapter element 23 either by means of the holding means 27 shown in FIG. 15 or by means of some other suitable device.

FIGS. 18 to 23 show a further embodiment of the invention in which a force effect is exerted on the projecting portions 9 of the ribs 5 likewise by a pressure plate and especially by a pressure ring 11. In contrast to the embodiment in accordance with FIGS. 1 to 17, however, in the present embodiment a different mechanism is provided for displacing the pressure ring 11. In particular, manually operable levers for displacing the pressure ring are not provided but instead the displacement is effected by an actuating device 15 in the form of a planetary-gear-like arrangement of gearwheels.

Figure 18:
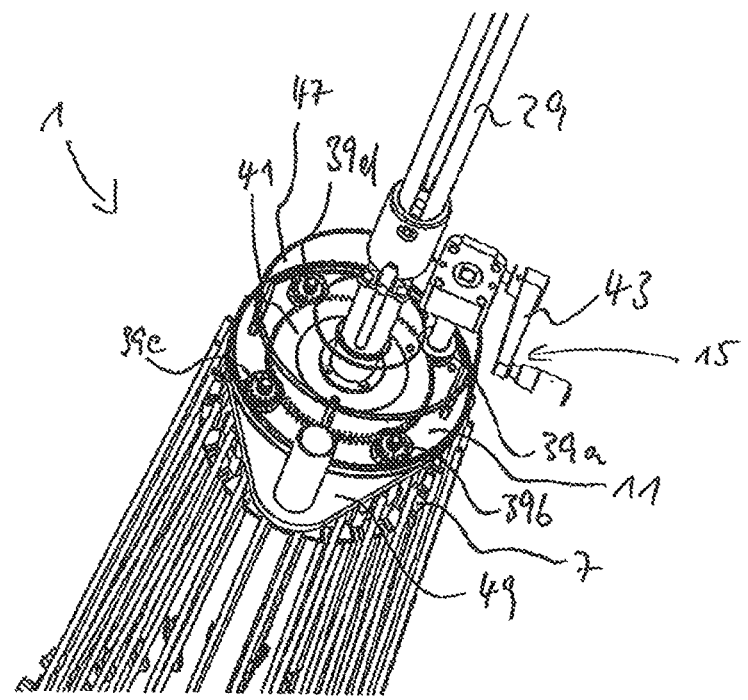
FIG. 18 is a perspective view of a folding reflector in accordance with a further embodiment of the invention.

FIG. 18 shows a perspective view of the reflector 1 in the closed state. Identical parts have been given identical reference symbols so that in this connection reference is made to the previous Figures in order to avoid repetitions.

The actuating device 15 for displacing the pressure plate is, as mentioned, of planetary-gear-like construction and comprises four relatively small outer gearwheels 39a to 39d which engage an inner larger gearwheel 41. The gearwheel 39a is driven manually by means of a hand crank 43. It will be understood that the gearwheel 39a can also be driven by means of an (electric) motor drive means or the like. On operation of the crank 43, the rotation of the gearwheel 39a brings about rotation of the large gearwheel 41, which in turn sets the remaining smaller gearwheels 39b, 39c and 39d in rotation.

Each of the smaller gearwheels 39a to 39d has an internal thread which co-operates with the external thread of a threaded bolt 45. Analogously to the guide bolt 13 of the first exemplary embodiment in accordance with FIGS. 1 to 17, the threaded bolt 45 is fixedly attached to the bearing body 7 and projects through corresponding through-bores in the pressure plate. On the side of the pressure plate opposite the bearing body 7, the threaded bolts 45 then engage the internal thread of the smaller gearwheels 39a to 39d.

Both the large gearwheel 41 and the smaller gearwheels 39a to 39d are preferably fixedly but rotatably connected to the pressure plate. The planetary gear is surrounded by a housing 47, the crank 43 being arranged outside the housing 47 in order to allow operation of the first gearwheel 39a.

Figure 19:
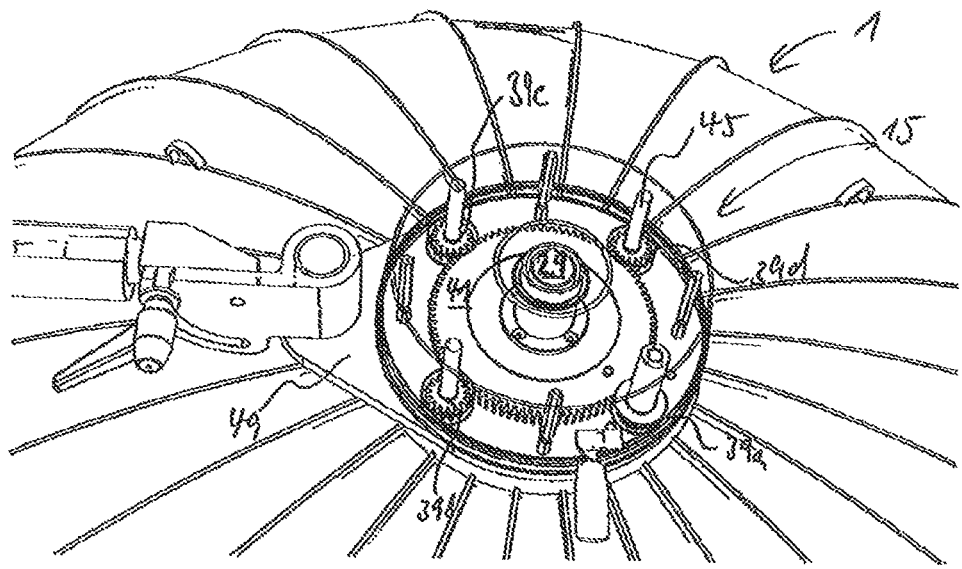
FIG. 19 is a perspective rear-side view of a folding reflector in the open position in accordance with the further embodiment.

The mode of operation of the drive mechanism shown in FIG. 18 shows that operation of the crank 43 brings about a rotational movement of the gearwheel 39a, which, as described above, results in rotation of the larger gearwheel 41 and therewith the further small gearwheels 39b to 39d. Depending upon the direction in which the crank 43 is turned, displacement of the pressure plate together with the gearwheels takes place either in the direction of the bearing body 7 or in the direction away therefrom. Displacement of the pressure plate in the direction of the bearing body 7 causes a force to be exerted on the projecting portions 9, so that the folding reflector 1 is displaced into its open position, as shown in FIG. 19. As in the embodiment in accordance with FIGS. 1 to 17, displacement of the pressure plate by means of the planetary gear causes a force to be exerted on the projecting portions 9 of the ribs 5. In that regard the present embodiment differs solely in the nature of the displacement mechanism of the pressure plate. Moreover, in FIGS. 18 and 19 a further umbrella holding means 49 is provided which can be formed integrally with the pressure plate or attached thereto.

Figure 20:
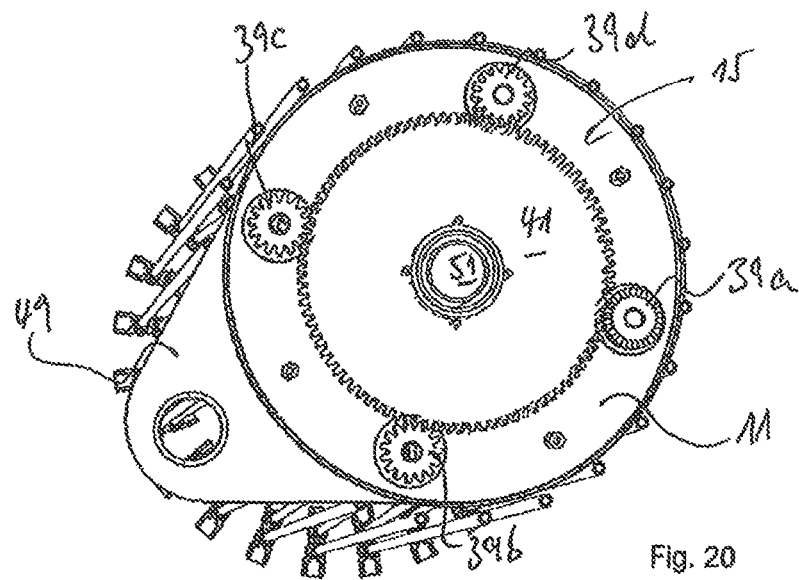
FIG. 20 is a plan view of the rear side of a collapsed folding reflector in accordance with the further embodiment.

FIG. 20 shows a rear-side plan view of the actuating device 15 in accordance with FIGS. 18 and 19 in the form of the planetary gear. The smaller gearwheels 39a to 39d in engagement with the larger gearwheel 41 are clearly visible. Also visible is an opening 51 arranged centrally in the larger gearwheel 41, which opening serves to receive the rod-like support 29 shown in FIGS. 18 and 19. It will be understood that more than or fewer than four smaller gearwheels can be used to implement the planetary gear in accordance with the present embodiment. Depending upon the size of the reflector and, in particular, upon the number of ribs, more than or fewer than four smaller gearwheels can be provided.

Figure 21:
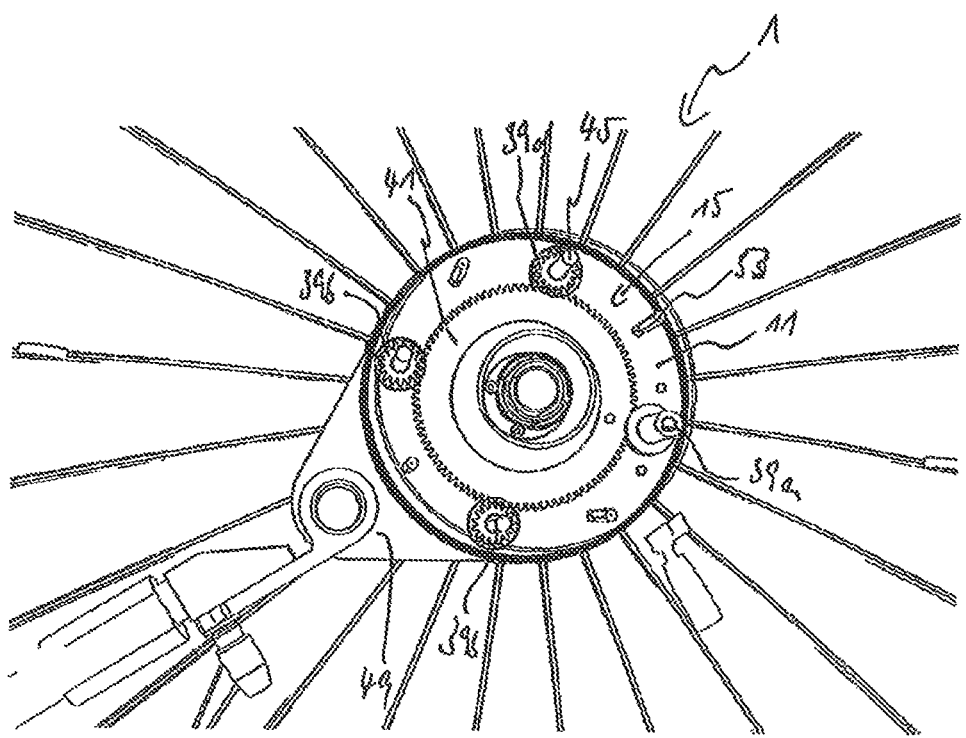
FIG. 21 is a rear-side view of a folding reflector in the open position in accordance with the further embodiment.

FIG. 21 shows a rear-side plan view of the planetary gear in accordance with the second embodiment in a folding reflector 1 in the open position and it will be seen that, in contrast to the collapsed reflector in accordance with FIG. 20, the pressure plate together with the gearwheels has been displaced in the direction of the bearing body 7, so that the threaded bolts 45 project substantially further beyond the side of the pressure plate opposite the bearing body 7. Furthermore, to join the pressure plate to the housing 47, which can be seen in FIGS. 18 and 19, it is also possible to provide connecting pins 53.

Figure 22:
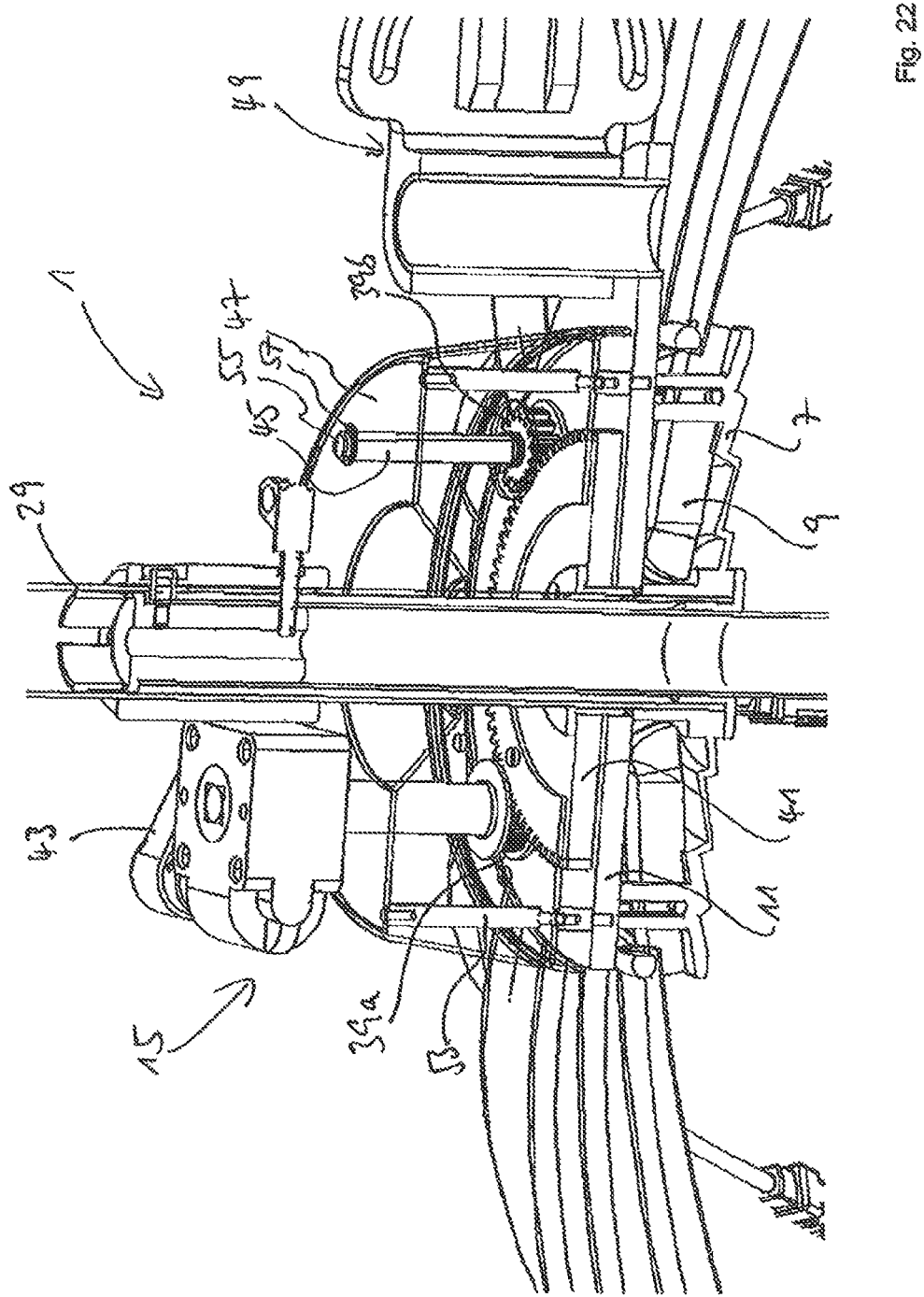
FIG. 22 is a sectional view of a folding reflector in the open position in accordance with the further embodiment.

FIG. 22 shows a sectional view of a folding reflector 1 in accordance with the embodiment of FIGS. 18 to 20 in the open position. In FIG. 22 it will be seen that on their ends 55 remote from the bearing body 7 the threaded bolts 45 have a stop element 57 in order to prevent the gearwheels 39a to 39d becoming completely unscrewed from the threaded bolts 45. The stop elements 57 are particularly necessary when no housing 47 is provided.

FIGS. 23 to 26 show a further embodiment of the invention which discloses another mechanism for displacing the pressure plate. Identical parts have been given identical reference symbols so that in this regard reference is made to the previous Figures in order to avoid repetitions.

In this embodiment the actuating mechanism for displacing the pressure plate has a tubular element 59 having an internal threaded portion 61. The internal threaded portion 61 of the tubular element 59 co-operates with the external thread 63 of a guide tube 65. The guide tube 65 is preferably attached to the bearing body 7 at its end facing the bearing body 7. The tubular element 59 is preferably in the form of a threaded sleeve.

The guide tube 65 and the tubular element 59 at the same time serve for the displaceable mounting of a rod-like support element 29' which is preferably of one-piece construction.

The tubular element 59 is at one end rotatably attached to the pressure plate. This is brought about by means of a connecting element 67 which encircles the tubular element 59 in such a way that the tubular element 59 is prevented from axial displacement relative to the pressure plate. For that purpose, the connecting element 67 is joined, especially screwed, to the pressure plate. At its other end the tubular element 59 comprises a handle 44 which is non-rotatably joined to the tubular element 59. To open the folding reflector 1, the handle 44 must be operated in such a way that the tubular element 59 turns relative to the guide tube 65. The co-operation between the internal threaded portion 61 of the tubular element 59 and the external thread 63 of the guide tube 65 brings about displacement of the pressure plate with the tubular element 59. Depending upon the direction in which the handle 44 is turned, displacement of the pressure plate and the tubular element 59 takes place either in the direction of the bearing body 7 or in the direction away therefrom. It will be understood that the handle 44 can in principle be replaced by an electric motor drive means or the like.

Figure 24:
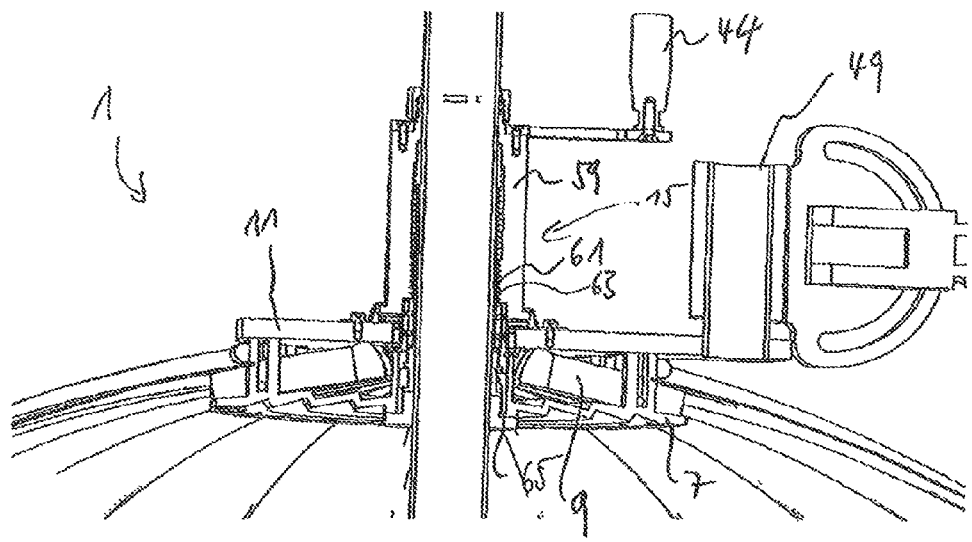
FIG. 24 is a further sectional view of the folding reflector in the open position in accordance with the further embodiment.

FIG. 24 shows the folding reflector 1 in an opened functional position. In this functional position, therefore, the handle 44 and therewith the tubular element 59 have been turned until the pressure plate has been displaced the maximum distance in the direction of the bearing body 7. In this state, maximum force is also exerted on the projecting portions 9 of the ribs 5.

Figure 23:
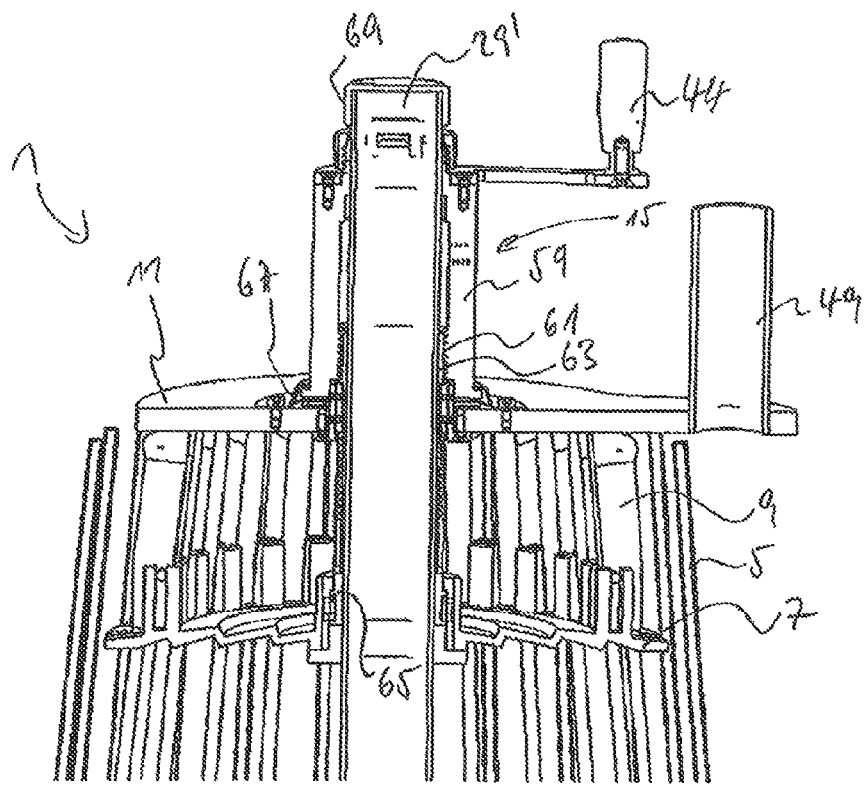
FIG. 23 is a sectional view of a collapsed folding reflector in accordance with another further embodiment of the invention.

FIGS. 23 and 24 show especially clearly a further example of a one-piece construction of the pressure plate and the umbrella holding means 49.

In this embodiment of the actuating mechanism, the rod-like support element 29' is preferably of one-piece construction, so that in the collapsed state the rod-like support element 29' can therefore be pushed fully into the folding reflector 1. A protective cap 69 on one end of the rod-like support element 29' prevents it from entirely disappearing in the tubular element 59. FIG. 23 also makes it clear that the tubular element 59 also serves for guiding the rod-like support element 29'. When the rod-like support element 29' is in the position shown in FIG. 23, that is to say in which the protective cap 69 abuts the tubular element 59, the handle 44 can easily be operated manually by a user.

Figure 25:
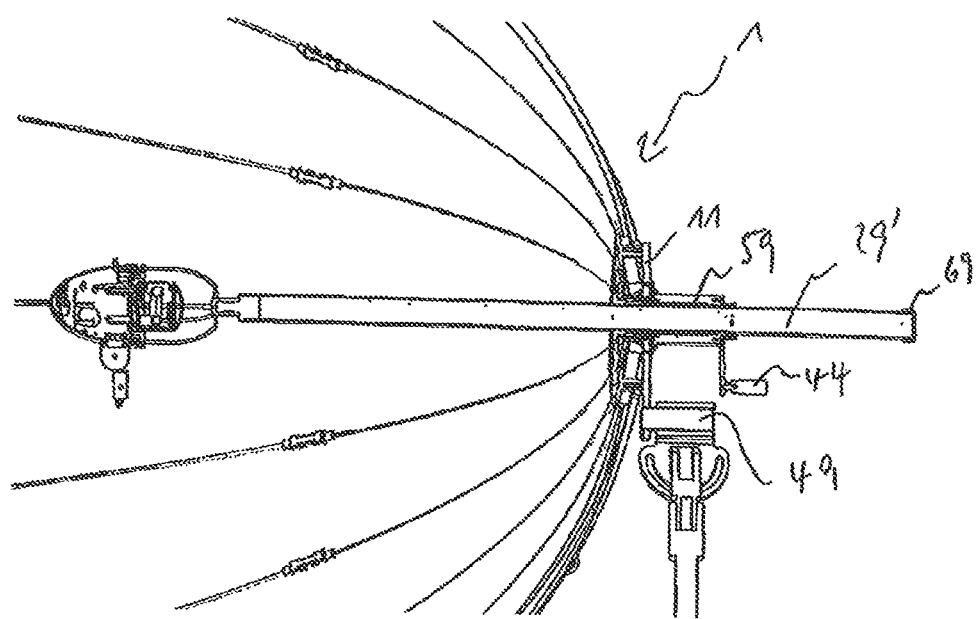
FIG. 25 is a sectional view of a folding reflector in the open position with a one-piece rod-like support element.
Figure 26:
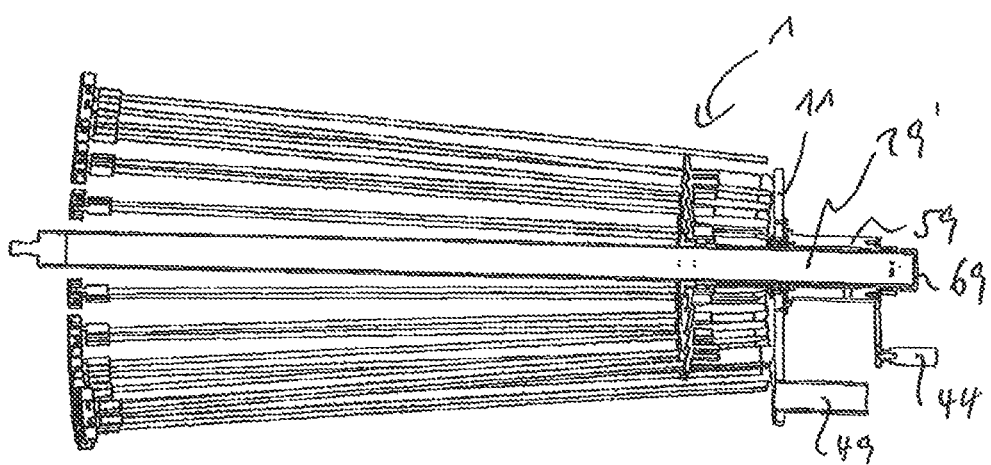
FIG. 26 shows the folding reflector according to FIG. 26 in a collapsed state.

FIGS. 25 and 26 show the advantageous variant of a rod-like support element 29' of one-piece construction. In comparison with the preceding embodiments in which the rod-like tubular element 29 consists of two pieces of tube, in the present embodiment it is possible, as mentioned, for the rod-like support element 29' to be displaced fully into the folding reflector 1, which makes the collapsed folding reflector 1 particularly easy to transport, as FIG. 26 clearly shows. As also in the case of the preceding embodiments, the rod-like support element can be connected to various lighting devices.

Overall, the present invention provides an advantageous mechanism which enables a reflector 1 to be opened and collapsed by a user in a simply way and which, furthermore, is economical to produce. The invention also enables a reflector 1 to be opened and collapsed without bracing ribs and without an umbrella shaft serving as support for the bracing ribs, thus providing substantially greater scope for mounting accessories on the reflector umbrella. Furthermore, the advantageous adapter element 23 allows simple attachment of any desired accessories to the reflector 1. The adapter 23 is moreover suitable for use with all the embodiments described.

The invention claimed is:

1. A folding reflector (1) having ribs (5) articulated in a circle on a bearing body (7), by means of which ribs a reflecting canopy (3) is arranged to be opened, characterized in that the ribs (5) each include a first portion and a second portion separated by an articulation site on the bearing body (7), with ends of the first portions facing their articulation site, and with the second portions (9) extending beyond the articulation site relative to the ends, and by the exertion of an effect on the second portions (9) of the ribs (5) the ribs 5 are movable into the open position and vice versa, characterized in that the effect exerted on the second portions (9) of the ribs (5) is brought about by a pressure ring (11) arranged opposite the bearing body (7) relative to the canopy (3), for which purpose the pressure ring (11) and the bearing body (7) are movable relative to one another.

2. The folding reflector according to claim 1, characterized in that the relative displacement between the pressure plate (11) and the bearing body (7) is brought about by means of an actuating device (15) which comprises a guide bolt (13) which is joined on the one hand to the bearing body (7) and on the other hand to the pressure plate in such a way that the actuating device (15) brings about displacement of the pressure plate along the guide bolt (13).

3. The folding reflector according to claim 2, characterized in that the actuating device (15) has a lever (17), especially a manually operable or motor-operable lever, connected to the guide bolt (13), which lever brings about displacement of the pressure plate.

4. The folding reflector according to claim 2, characterized in that the bearing body (7) is connected to an adapter element (23) for attaching accessories (25) and/or a stand (33) or is formed in one piece with such an adapter element (23).

5. The folding reflector according to claim 4, characterized in that the adapter element (23) is arranged for attachment of a lighting device.

6. The folding reflector according to claim 1, characterized in that the second portions (9) are clamped between the bearing body (7) and the pressure ring (11).

7. The folding reflector according to claim 1, characterized in that the bearing body (7) is annular.

8. The folding reflector according to claim 7, characterized in that the ribs (5) are articulated in slots (10) which are arranged radially in the bearing body (7) and are open towards the peripheral face of the bearing body.

9. The folding reflector according to claim 1, characterized in that the effect exerted on the portions (9) of the ribs (5) extending beyond the articulation site thereof is brought about by a cable, rope or the like which acts on the free ends thereof and by means of which the said portions (9) can be pulled radially inwards manually or by means of a motor.

10. The folding reflector according to claim 1, characterized in that the ribs (5) can be fixed in the open position.

11. The folding reflector according to claim 1, characterized in that the portions (9) of the ribs (5) that extend beyond the articulation site on the bearing body (7) have an enlarged diameter relative to the remainder of the ribs.

12. The folding reflector according to claim 1, characterized in that it does not have bracing ribs connected to the ribs (5).

13. The folding reflector according to claim 1, characterized in that the bearing body (7) can be attached directly or indirectly to a stand.

14. The folding reflector according to claim 1, characterized in that the reflecting canopy (3) has seams on its outer side or has fastening means, especially loops, preferably rubber loops, on its inner side for receiving the ribs (5).

15. The folding reflector according to claim 1, characterized in that the reflector has fastening means, especially eyelets, by means of which it can be suspended.

16. The folding reflector according to claim 1, characterized in that the reflecting canopy (3) is a metalized foil.

17. The folding reflector according to claim 1, characterized in that it has at least 8 or 12, especially 16, preferably 24, ribs (5).

18. The folding reflector according to claim 1, characterized in that the ribs (5) are made of glass-fibre-reinforced plastics, of carbon-fibre-reinforced plastics and/or of metal, especially of steel.

19. The folding reflector according to claim 1, characterized in that a one-part or multi-part rod-like support (29, 29') for a light source extends through the bearing body (7), especially so as to be longitudinally displaceable, in such a way that, in the case of a support that is mounted so as to be longitudinally displaceable, the light source can be displaced axially therewith inside the umbrella canopy (3).

20. The folding reflector according to claim 19, characterized in that the light source is arranged at the end-face end of the rod-like support (29, 29') so that it is located on the longitudinal centre axis of the opened reflector (1).

21. The folding reflector according to claim 19, characterized in that the light source is mounted on the support (29, 29') so as to be longitudinally displaceable.

22. The folding reflector according to claim 1, characterized in that the relative displacement between the pressure plate and the bearing body (7) is effected by means of a mechanical actuating device, wherein the mechanical actuating device includes one of an electromagnetic, pneumatic or hydraulic drive means.

23. The folding reflector according to claim 2, characterized in that the actuating device (15) effects displacement of the pressure plate along a threaded bolt (45).

24. The folding reflector according to claim 2, characterized in that the actuating device (15) for displacing the pressure plate is in the form of a manually operated or motor-driven planetary gear.

25. The folding reflector according to claim 2, characterized in that the actuating device (15) has a guide tube (65) having an external thread (63), which guide tube is non-rotatably joined to the bearing body (7) and co-operates with an internal threaded portion (61) of a tubular element (59) that is rotatably joined to the pressure plate.

26. The folding reflector according to claim 25, characterized in that the tubular element (59) is operable mechanically or manually by means of a handle (44).

* * * * *